United States Patent Office 3,466,054
Patented Sept. 9, 1969

3,466,054
SEALING DEVICE BETWEEN A MOVABLE SURFACE AND A STATIONARY SURFACE
Lennart G. Berg, Fylgiavagen 1,
Djursholm, Sweden
Filed Sept. 27, 1966, Ser. No. 582,463
Claims priority, application Switzerland, Oct. 21, 1965,
13,647/65
Int. Cl. F16j *15/00, 9/00, 1/02*
U.S. Cl. 277—169                    2 Claims

ABSTRACT OF THE DISCLOSURE

A sealing device positioned between a piston and cylinder comprising a rigid annular support member, such as a steel ring, inserted in an endless annular rubber hose so as to be enclosed in the tubular space within said hose. A guide member made of a material having a low coefficient of friction is positioned in a circumferential groove in either the piston or the cylinder for supporting the hose. When the piston and cylinder are moved axially relative to each other the hose rolls along in sealing relationship with the other surface while rotating around the steel ring.

---

This invention is concerned with a sealing device between a movable cylindrical surface and a stationary cylindrical surface concentric with said movable surface.

A known sealing device of this type consists of a ring made of an elastic material and adapted to roll between the two surfaces while filling out and sealing the space or interstice between these surfaces. This sealing device however has the disadvantage of permitting only a limited axial movement between the cylindrical surfaces.

It is an object of this invention to eliminate this disadvantage and to enable a practically unlimited axial movement to take place between the surfaces, for example permitting a piston to move freely axially along an elongated cylinder or tube in which it is mounted, without any limitations to its axial displacement.

The chief characteristic of the sealing device according to this invention is that it comprises an annular rigid support means inserted in a casing of elastic material which is adapted to roll in sealing relationship between one of the said surfaces and the support means, the support means with its casing being seated in a guide means which consists of a material having a low coefficient of friction and is mounted in a radial groove in the other one of said surfaces.

Figure 1:
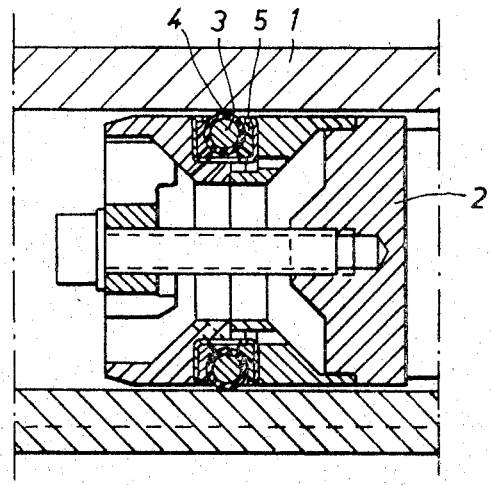
Figure 2:
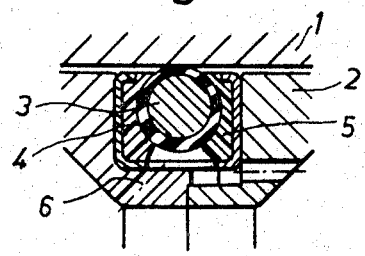

The invention is further illustrated in the attached drawing. It will be understood, however, that the present invention is not in any way restricted to the embodiment shown therein. In the drawing, FIG. 1 shows an embodiment of the sealing device mounted on a piston in a tube, and FIG. 2 shows, on a larger scale, a section through the support means, casing and guide means of the sealing device.

In the drawing 1 is an elongated tube having a piston 2 inserted therein. The piston is formed with a radial groove having mounted therein an annular support means, for example in the form of a steel ring 3, which is surrounded by a casing 4 of elastic material, such as rubber. The steel ring with its rubber casing is seated in a guide means 5 which consists of a material having a low coefficient of friction, for example plastics, such as polytetrafluoroethylene or a polyamide plastics, or sintered metal soaked with a lubricant such as sintered bronze soaked with a polysiloxane oil. The rubber casing 4 lies sealingly against the wall of tube 1 and against the guide means 5, and when the piston 2 is displaced inside the tube the casing 4 will roll about the ring 3 and against the interior face of the tube. Preferably a minor quantity of lubricant is introduced interiorly of the casing in order to reduce friction between ring 3 and casing 4 as much as possible. For instance, a drop of polysiloxane oil may be introduced into the casing by means of an injection needle. To ensure uniform rolling of the casing on the ring it is suitable to apply the casing onto the ring under a certain amount of tension. The device may give rise to the generation of more or less heat—depending upon the sealing pressure, the rate at which the piston is moving etc.—so that in some cases it may be necessary or desirable to effect cooling of the device. Therefore, in the embodiment as shown in the drawing, a channel 6 is provided for the supply of cooling medium to the sealing device.

The device of this invention has the further advantage that it gives a very good sealing also between, for instance, a piston and cylinder having more or less rough surfaces, so that such surfaces will not require any special finishing treatments. The cylindrical surfaces moreover need not have an exactly circular cross section; the sealing device according to this invention can actually be employed between two, relatively to each other movable cylinder surfaces of uniform cross section in the form of any type of closed curve without discontinuities. Also, the device as illustrated may be modified so that the support ring with its casing and the guide means are mounted in the wall of the cylinder or tube, with the casing rolling against the exterior face of a piston or piston rod.

It should be appreciated that this invention is not in any way limited to the particular embodiments described above but that many modifications may be made, as will be readily understood by those skilled in the art, without departure from the scope and spirit of this invention.

I claim:
1. A sealing ring device between a movable cylindrical surface and a stationary cylindrical surface concentric therewith, one of said surfaces having a circumferential groove, said device comprising:
   a rigid, annular support means;
   an endless annular elastic hose surrounding said annular support means, said hose being free to rotate around said rigid support means; and
   a guide member positioned in said circumferential groove for receiving said annular support means and elastic hose, said guide member being made of a material having a low coefficient of friction so that as said cylindrical surfaces are moved axially relative to each other the periphery of said hose rolls along in sealing relationship with the other one of said cylindrical surfaces while rotating around said rigid support means.
2. A sealing device as recited in claim 1 wherein said annular elastic hose is made of rubber.

References Cited

UNITED STATES PATENTS

| 207,871 | 10/1878 | Horton et al. | 277—173 |
| 2,263,178 | 11/1941 | Lignian et al. | |
| 3,366,017 | 1/1968 | Firth et al. | 92—178 X |
| 3,111,325 | 11/1963 | Reiling | 277—227 |

FOREIGN PATENTS 982,860   2/1965   Great Britain.

SAMUEL ROTHBERG, Primary Examiner

U.S. Cl. X.R.
178—23; 340—346

UNITED STATES PATENT OFFICE
CERTIFICATE OF CORRECTION

Patent No. 3,466,054 September 9, 1969

Lennart G. Berg

It is certified that error appears in the above identified patent and that said Letters Patent are hereby corrected as shown below:

In the heading to the printed specification, line 7, "Switzerland" should read -- Sweden --.

Signed and sealed this 21st day of April 1970.

(SEAL)
Attest:

Edward M. Fletcher, Jr.             WILLIAM E. SCHUYLER, JR.
Attesting Officer                    Commissioner of Patents